United States Patent [19]

Soborski

[11] Patent Number: 5,815,018
[45] Date of Patent: Sep. 29, 1998

[54] PULSE MODULATOR CIRCUIT FOR AN ILLUMINATOR SYSTEM

[75] Inventor: Michael L. Soborski, Hightstown, N.J.

[73] Assignee: Systech Solutions, Inc., Cranbury, N.J.

[21] Appl. No.: 680,955

[22] Filed: Jul. 16, 1996

[51] Int. Cl.$^6$ .......................... H03K 3/017; H03K 7/08
[52] U.S. Cl. ......................................... 327/172; 327/295
[58] Field of Search ................... 327/172–176, 327/178, 179, 227, 165, 166, 269, 271, 290, 291, 293, 295, 108, 109, 514, 515

[56] References Cited

U.S. PATENT DOCUMENTS

| | | | |
|---|---|---|---|
| 3,525,861 | 8/1970 | Alexander et al. | 364/851 |
| 3,868,570 | 2/1975 | Kopera, Jr. | 324/166 |
| 3,902,806 | 9/1975 | Bober | 356/41 |
| 4,001,667 | 1/1977 | Bober | 323/1 |
| 4,687,952 | 8/1987 | Capizzi, Jr. | 327/227 |
| 4,717,864 | 1/1988 | Fultz | 318/254 |
| 4,835,549 | 5/1989 | Samejima et al. | 346/76 PH |
| 4,882,498 | 11/1989 | Cochran et al. | 250/571 |
| 4,893,598 | 1/1990 | Daggett | 318/568.16 |
| 4,972,093 | 11/1990 | Cochran et al. | 250/572 |
| 4,978,220 | 12/1990 | Abramovich et al. | 356/394 |
| 5,015,840 | 5/1991 | Blau | 250/221 |
| 5,051,872 | 9/1991 | Anderson | 362/32 |
| 5,166,753 | 11/1992 | Tokura | 356/394 |
| 5,233,337 | 8/1993 | Takahashi | 340/782 |
| 5,302,836 | 4/1994 | Siu | 250/572 |
| 5,317,307 | 5/1994 | Thomas, Jr. | 340/815.45 |
| 5,365,341 | 11/1994 | Sugawara | 356/394 |
| 5,369,492 | 11/1994 | Sugawara | 356/394 |

OTHER PUBLICATIONS

Advanced Illumination ELS 1000 Electronic Controller Specification sheet (undated).
Advanced Illumination ELS 4236 Circular Light Head Specification sheet (undated).

*Primary Examiner*—My-Trang Nu Ton
*Attorney, Agent, or Firm*—Buchanan Ingersoll, P.C.

[57] ABSTRACT

An illuminator system is provided that is responsive to a trigger signal from a remote source to supply controlled pulses to a load, such as an array of light emitting diodes in a LED strobe. The LED strobe is positioned in close proximity to a lens mounting system. The system of the present invention includes a remote trigger source, a load such as an array of light emitting diodes, and a pulse gate section. The pulse gate section includes a trigger interface having an input connected to the trigger source and is configured to generate a pulse trigger signal in response to a trigger signal from the trigger source. A clock generator responds to the pulse trigger signal by generating at least one clock signal, and a flash pulse generator responds to the clock signal and to at least one user definable input signal by generating a flash pulse signal. The flash pulse signal is used to activate or deactivate the load, and a load drive section is used to drive the load.

19 Claims, 5 Drawing Sheets

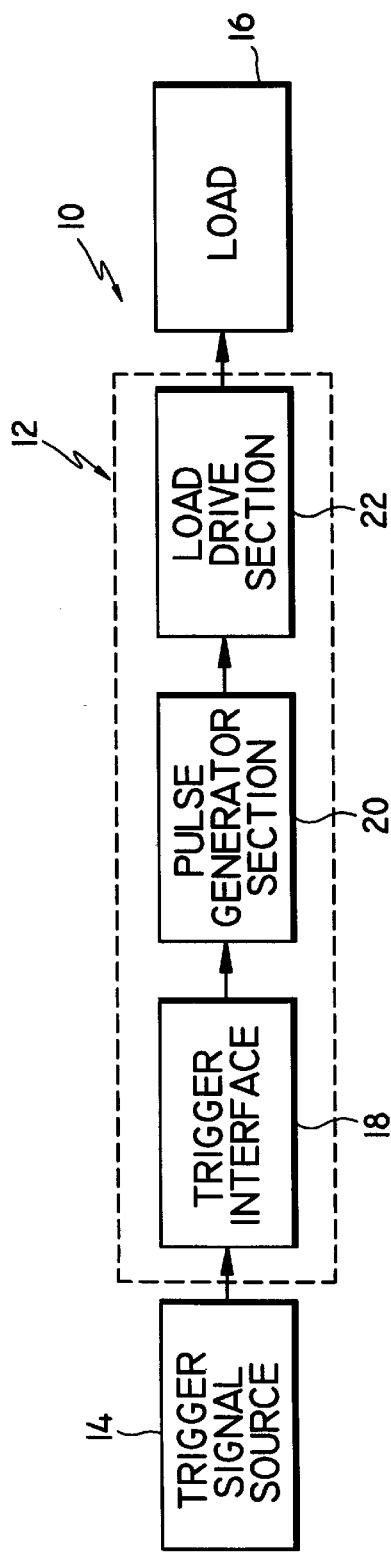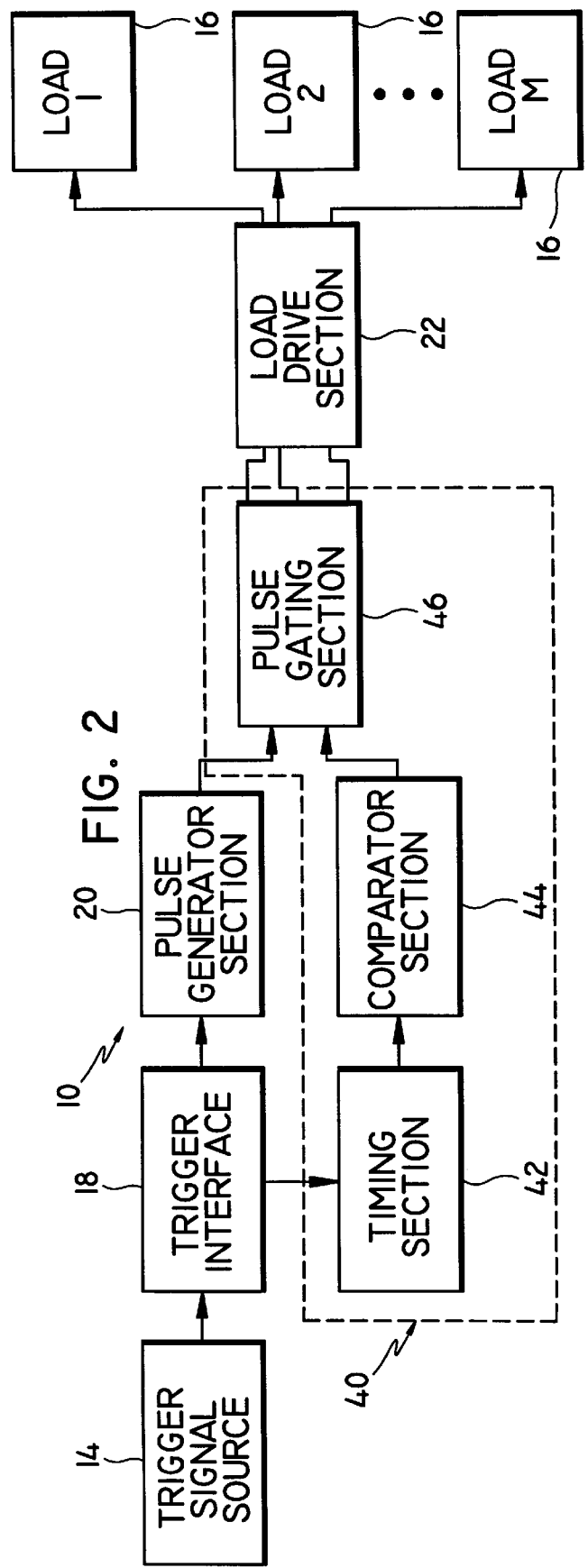

PULSE MODULATOR CIRCUIT FOR AN ILLUMINATOR SYSTEM

BACKGROUND

1. Field of the Invention

The present invention relates to a system for individually driving a plurality of loads for short periods of time. More particularly, the present invention relates to a pulse generator system used in an LED strobe illuminator that strobes an LED array with different pulse trains that may have different duty cycles.

2. Description of the Related Technology

Lighting devices used, for example, in high speed machine inspection systems typically illuminated an area, such as a machine part, being inspected with a short burst of high intensity light and then videotape or photograph the illuminated area. To generate such high intensity bursts of light, current systems typically employ pulse generators which generate a pulse waveform to drive a light source.

Current pulse generators use linear or digital circuits arranged to periodically charge and discharge to output a pulse having a predefined pulse width. One such linear circuit includes set-reset (SR) latches, a pair of comparators and an RC tank circuit gated through a discharge transistor. In this circuit, the main timing components are the resistor and capacitor forming the RC tank circuit. The RC tank circuit defines an intrinsic time constant which determines the charge/discharge timing and thus the pulse width of the output signal generated by the pulse generator. However, the values of such timing components can change in response to, for example, thermal variations, manufacturer tolerances, and aging. As a result, the time constant for this linear pulse generator circuit is at best unstable over a long period of time. Further, variations in the supply voltage and circuit loading can also degrade the stability and accurate repeatability of the output pulse of such linear pulse generators.

Variations in the pulse width of the output pulse are unacceptable in, for example, high speed inspection systems, so that alternative techniques such as digital pulse generators have been developed. Current digital pulse generator circuits include an oscillator, a set of binary counters and either a counter preset stage or a binary magnitude comparator responsive to the counter values. Such digital circuits also include a triggering circuit to initiate the pulse generation cycle. In such digital pulse generators, the counters count up to or down from a preset value which determines the pulse width of the output signal. However, these digital pulse generators suffer similar drawbacks as the linear pulse generators and require numerous components to generate the pulse waveform. As a result, large scale integration of such digital pulse generators is uneconomical.

The present invention provides an alternative choice for driving a single load or alternatively a plurality of loads with different pulse trains. The illuminator system of the present invention provides a pulse generator that is more efficiently designed so that fewer components are needed and the manufacturing process is simplified. Further, the pulse generator provides an output signal that is more stable and repeatable than current linear and digital pulse generators.

SUMMARY OF THE INVENTION

The present invention provides a pulse generator system used to drive one or more loads for short periods of time. Typically, the pulse generator system is responsive to a trigger signal provided from a remote source, and provides either a periodic or aperiodic load drive signal to individually activate or deactivate the loads.

In one embodiment, the pulse generator system includes a trigger interface having an input connected to the trigger source, which is configured to generate a pulse trigger signal in response to a trigger signal from an external trigger source. A clock generator that is responsive to the pulse trigger signal is provided to generate at least one clock signal (e.g., a 25 kHz clock signal). A flash pulse generator responsive to the clock signal and to at least one user definable input signal is provided to generate a flash pulse signal having a duration (or pulse width) that is defined by the user definable input signal. The flash pulse signal is used to activate or deactivate the load, and a load drive section that is responsive to the flash pulse signal is used to provide the current to drive the load. Preferably, the trigger interface isolates the output pulse trigger signal from variations in the trigger signal to avoid false triggering of the clock generator section so that the system generates a stable flash pulse signal. One way to isolate the pulse trigger signal from the trigger signal is by using a phototransistor to optically isolate the output from the signals.

In another embodiment, the pulse generator system includes a trigger interface having an input connected to an external trigger source, which is configured to generate a pulse trigger signal in response to a trigger signal from the external trigger source. The system also includes a clock generator responsive to the pulse trigger signal and configured to generate a plurality of clock signals including a flash pulse clock signal and a duty cycle clock signal. A flash pulse generator responds to the flash pulse clock signal and to at least one user definable input signal by generating a flash pulse signal which enables activation of the plurality of loads. To set the duty cycle for each signal driving a load, a timing section is provided that responds to the duty cycle clock signal by outputting duty cycle count data. Then a comparison section compares the timing section output duty cycle count data with duty cycle count data defined by a user, and outputs at least one comparison signal. A gating section receives the flash pulse signal and the comparison output signal or signals, and outputs a plurality of load drive signals. A load drive section has a plurality of load drivers used to drive one of the loads.

In this alternative embodiment, the timing section includes an n-bit counter such as a 4-bit counter, the comparison section includes a plurality of n-bit (e.g., 4-bit) comparators, and the gating section includes a plurality of gating circuits arranged such that one of the plurality of gating circuits corresponds to one of the plurality of loads.

The present invention also provides an illuminator system that utilizes the pulse generator system of the present invention connected between a trigger source and one or more loads, such as arrays of light emitting diodes. The illuminator system is typically used in article inspection systems where each load is positioned in close proximity to a lens mounting system which supports a camera lens used to videotape or photograph an area illuminated by the load. The trigger source used with the illuminator system may be a computer programmed to automatically generate the trigger signal at predetermined or at randomly generated intervals. However, the trigger source may also be a manual device responsive to user activation.

BRIEF DESCRIPTION OF THE DRAWINGS

Preferred embodiments of the invention are described hereinbelow with reference to the drawings wherein:

FIG. 1 is a block diagram of one embodiment of the illuminator system according to the present invention, illustrating a trigger signal source, a pulse gate module, and a load;

FIG. 2 is a block diagram of an alternative embodiment of the illuminator system according to the present invention, illustrating a trigger signal source, a pulse gate module, a pulse modulator module, and a plurality of loads;

DETAILED DESCRIPTION OF THE PREFERRED EMBODIMENT

Figure 3:
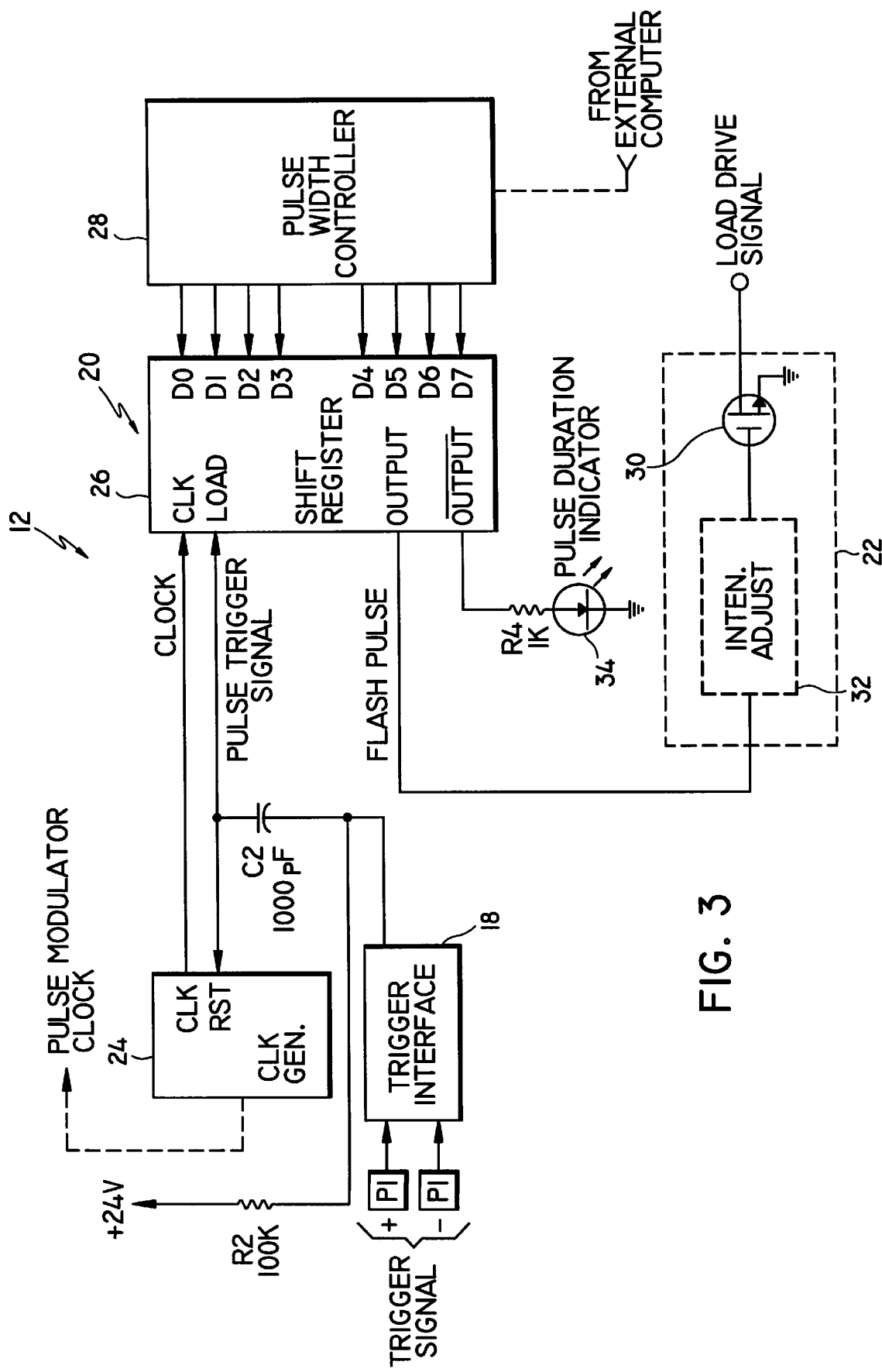
FIG. 3 is a circuit diagram of the pulse gate module according to the present invention.

The present invention provides a pulse generator system used to drive one or more loads for short periods of time. Typically, the pulse generator system is responsive to a trigger signal provided from a remote source, and provides either a periodic or aperiodic load drive signal to individually activate or deactivate the loads. For the purposes of the present application the pulse generator system will be described with an illuminator system for article inspection purposes. However, the pulse generator system of the present invention may be used with various types of systems to drive various types of loads.

Referring to the drawings, FIG. 1 is a block diagram of an embodiment of the illuminator system of the present invention. The illuminator system 10 of the present invention provides a pulse generator system (or pulse generator module) 12 having an input connected to a trigger source 14 and an output connected to a load 16. The trigger source 14 generates a trigger signal and transfers the trigger signal to the pulse generator module 12. The pulse generator module 12 responds to a trigger signal transmitted by the source 14, and generates a flash pulse to drive a single load (not shown).

The load is preferably an array of light emitting diodes in an LED strobe positioned in close proximity to a lens mounting system (not shown). The lens mounting system supports the camera lens used to record, videotape, or photograph the illuminated area. However, other types of loads may be driven by the pulse generator module 12. For example, the load may be a laser source, an ultrasound transducer or a magnetic actuator.

The trigger source 14 includes for example a computer, such as a P.C. based frame (video) grabber card and a communication driver circuit configured to output a trigger signal (or pulse) to the pulse generator module 12. Preferably, the trigger signal is a 0–24 volt DC differential trigger signal. Although, the pulse gate module embodiment discussed above is responsive to a differential trigger signal, the trigger source 14 may be configured to output different types of trigger signals, and the pulse gate module may be configured to respond to other types of trigger signals.

Figure 5:
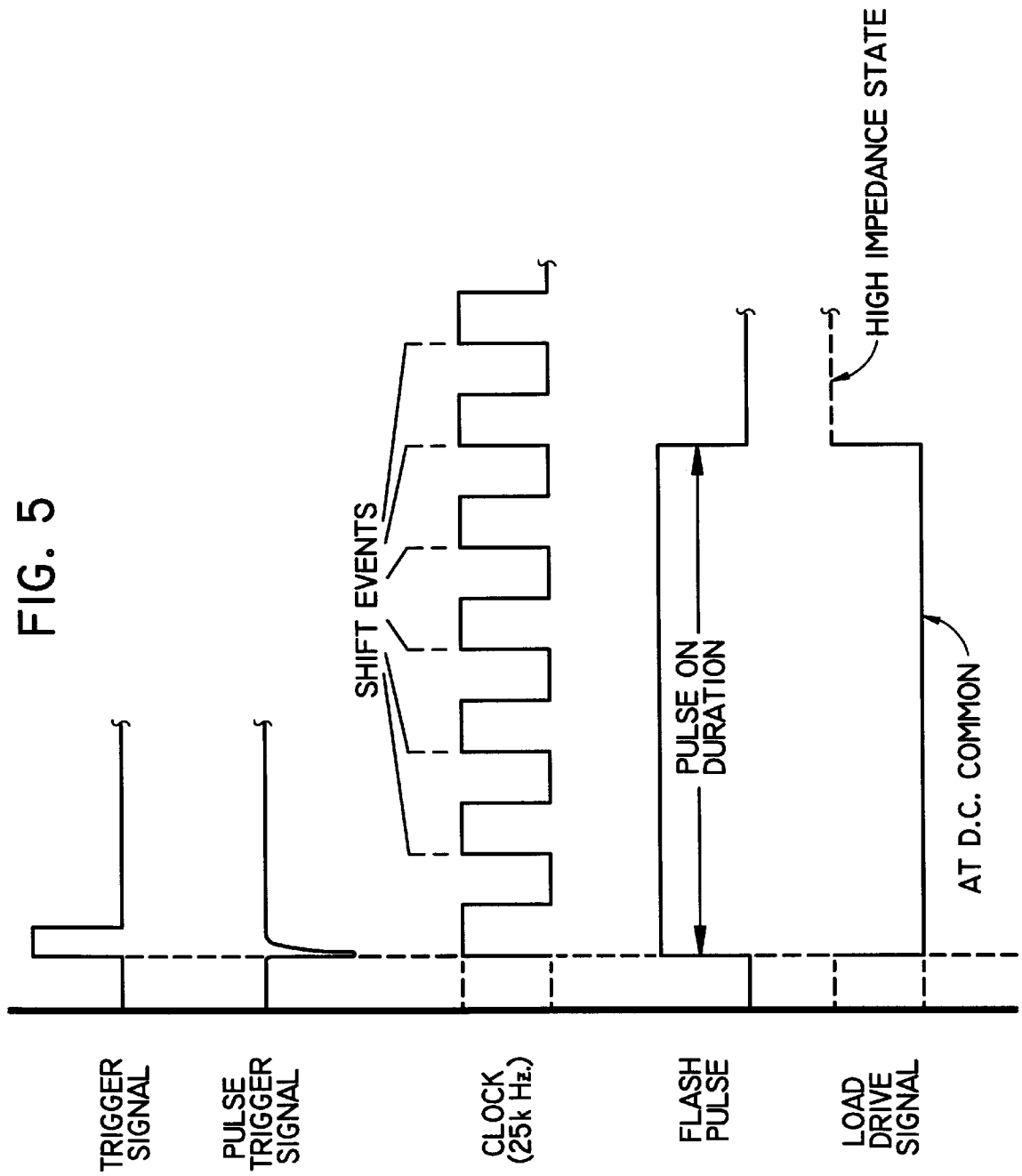
FIG. 5 is a timing diagram illustrating a trigger signal and an output pulse initiated by the trigger signal.

Referring to FIGS. 1 and 3, the pulse generator module 12 includes a trigger signal interface section 18, a pulse generator section 20, and a load drive section 22 that operate together to provide a repeatable short duration pulse waveform used to drive the load 16, seen in FIG. 5. The trigger interface section 18 is preferably an optically isolated interface that uses a phototransistor to generate an output that is electrically isolated from the input trigger signal. An example of a suitable optically isolated interface is the I305K Opto Isolator by ISOCOM. An input side of the trigger interface section 18 receives the trigger signal from the trigger source 14, and a pulse trigger signal is generated by the phototransistor. The pulse trigger signal is applied to a clock generator 24 in the pulse generator section 20. Preferably, the clock generator is a programmable crystal oscillator/frequency divider configured to output a 25 kHz and 1 MHz clock signals having a frequency tolerance that is no greater than 0.01% from between about 0 degrees and about 70 degrees centigrade. Examples of a suitable clock generator 24 includes the EPSON AMERICA, INC. series of Programmable Crystal Oscillators/Frequency Dividers. The output pulse trigger signal passes through a high-pass RC filter and resets the clock generator 24 so that trigger events occurring in the middle of a shift out cycle are not truncated. The output pulse trigger also loads flash pulse width data into a pulse generator 26 of the pulse generator section 20.

The pulse generator 26 is preferably a parallel load serial shift register which is clocked by the clock generator output signal. Data bits of the shift register are connected to a pulse width controller 28 that is used to set the pulse width of the flash pulse from the pulse generator section 20. The pulse width controller 28 is preferably an n-bit dip switch where "n" corresponds to the number of bits used as input data bits in the pulse generator 26. Alternatively, the controller 28 may be a latch or other storage device (e.g., RAM or ROM) that is connected to an external computer, such as the trigger signal source 14, and the count value is stored in the storage device and retrieved therefrom in response to input signals from the external computer.

In the embodiment shown in FIG. 3 where the shift register is 8 bits and the period for the 25 kHz clock is 40 μs, the flash pulse width can be varied from between 0 and 320 μs in 40 μs increments. However, the range of the flash pulse width can be increased or decreased by changing, for example, the number of bits of the pulse generator 26. The range of the flash pulse width can also be increased or decreased by altering the output frequency of the clock generator. As an example, the period of the output frequency of the clock generator may be changed from about 40 μs to about 4 μs which would permit a pulse step change resolution of 4 μs increments instead of 40 μs increments. As another example, where the shift register is 8 bits and the period for the clock generator output is 1 μs (i.e., the clock generator is programmed to run at about 1 MHz), the pulse step change resolution would be about 1 μs.

The shift register 26 is loaded with the output data (or count value) of the pulse width controller 28 by the pulse trigger signal. The loaded count value of the shift register 26 begins a flash pulse ON duration, seen in FIG. 5. The clock then begins to shift out the loaded value through the shift register 26. In the embodiment of FIG. 3, during the flash pulse ON duration, the output of the shift register 26 is set high (logic "1") to turn ON the load drive section 22 and activate the load 16. When the loaded count value has shifted out of the shift register 26, the flash pulse turns OFF, thus turning OFF the load drive section 22 and deactivating the load 16.

The load drive section 22 preferably includes a load driver 30 (or switch), such as an n-channel logic level HEXFET configured to pull the DC return side of the switched load to DC common, which is driven directly from the output of the pulse generator 26. Other types of load drive circuits which can be driven by the output of the pulse generator 26 are contemplated. For example, the load driver circuit 22 may be a NPN power transistor (BJT). In an alternative embodiment, the output of the pulse generator 26 may be input into an intensity adjust device 32 which limits the current to the load driver 30.

In typical operation, a trigger signal is received by the trigger interface 18 and converted to the pulse trigger signal. The pulse trigger signal simultaneously resets the clock generator 24 and loads the count value into the pulse generator 26 to begin the flash pulse ON duration. The load 16 is then activated. The clock signal then shifts out the count value in the pulse generator (shift register) and when the last bit of the count is shifted out the flash pulse turns OFF so that the load is deactivated. When the flash pulse turns OFF a pulse duration indicator 34, seen in FIG. 3, also flashes OFF.

Referring to FIG. 2, an alternative embodiment of the illuminator system 10 of the present invention is shown. In this embodiment, the pulse generator module 12 also includes a pulse modulator module 40. The trigger signal interface section 18 and pulse generator section 20 of the pulse generator module 12 for this embodiment are substantially similar to those discussed above for the embodiment of FIG. 1, except that the load drive section 22 includes a plurality (between 1 and m) of load drivers 30 used to drive a plurality (between 1 and m) of loads 16. The pulse modulator module 40 includes a timing section 42, a comparator section 44 and a pulse gating section 46, and receives the flash pulse from the pulse generator section 20 and generates multiple pulse width modulated (PWM) pulse trains (or signals) of varying duty cycles. The PMW signals drive multiple load driver sections 22 in a timed manner controlled for selectively driving a plurality of loads. The pulse modulator module 40 permits the user to adjust the duty cycle of each PMW pulse train independently.

Figure 4:
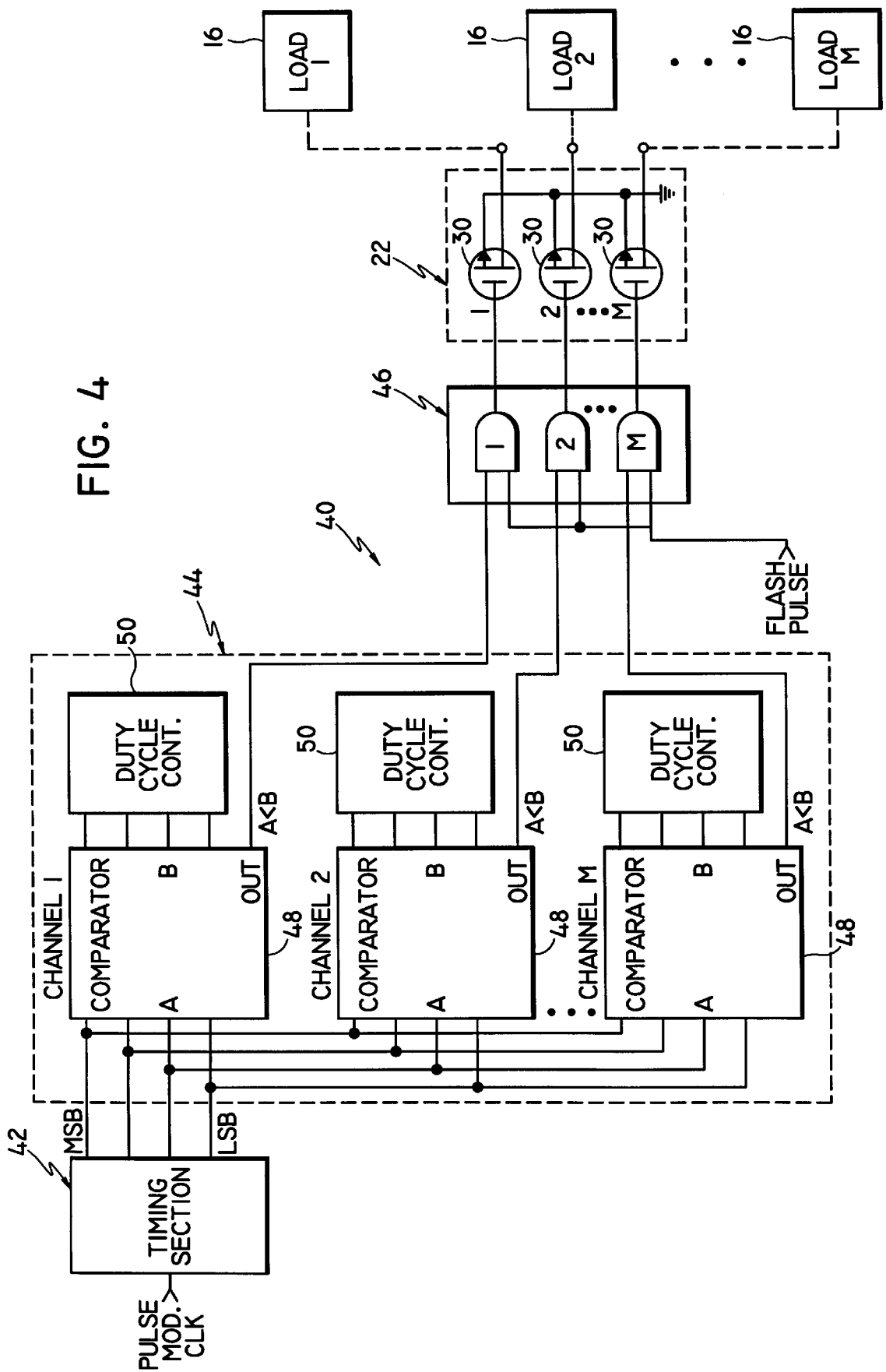
FIG. 4 is a circuit diagram of a pulse modulator module according to the present invention.

Referring now to FIG. 4, the timing section 42 uses a pulse modulator (PM) clock signal generated by the clock generator 24 as a clock for the timing section 42. The pulse modulator clock is preferably a 1 MHz clock signal. The timing section 42, seen in FIG. 4, includes a counter (e.g., a 4-bit binary counter) that continuously counts up from 0 and wraps around upon overflow to output data (e.g., a count value) which is used to set the duty cycle of each PWM pulse train. To illustrate, if a 4-bit counter is used in the timing section 42, the counter continuously counts from 0 Hex to 0F Hex wrapping around upon overflow and outputs these count values as data input into the comparator section 44.

The comparator section 44 includes a plurality of magnitude comparators 48, one comparator for each PM channel, i.e., one comparator per load 16. Each comparator 48 compares the count value transferred by the timing section 42 with a value set by corresponding duty cycle controller 50. In the embodiment of FIG. 4, each duty cycle controller 50 is a 4-bit dip switch. However, the number of bits may vary depending upon for example the number of output data bits the timing section has. Further, alternative embodiments of the duty cycle controller 50 include, for example, latches or other storage devices that are connected to the external computer and the count value is stored in the storage devices and retrieved therefrom in response to input signals from the external computer. A comparison output (e.g., the A<B output) of each comparator 48 is used as the PM signal output. The frequency of the PM signal is typically 62.5 kHz and the duty cycle is established by the relative ON/OFF times of the comparison output. The PM signal output of each comparator 48 is transferred to the gating section 46 to drive their respective loads 16.

The gating section 46 provides gating control of the PM signals into controlled bursts having a duration defined by the pulse width of the pulse gate module output (i.e., the pulse width of the flash pulse). The gating section 46 preferably uses multiple AND gates to provide gating control. However, other known types of gating circuits are contemplated.

In operation, a trigger signal is received by the trigger interface 18 and converted to the pulse trigger signal. The pulse trigger signal simultaneously resets the clock generator 24 and loads the count value into the pulse generator 26 to begin the flash pulse ON duration. The clock generator outputs the 25 kHz clock for the pulse generator 26 and the 1 MHz clock for the timing circuit 42.

Figure 6:
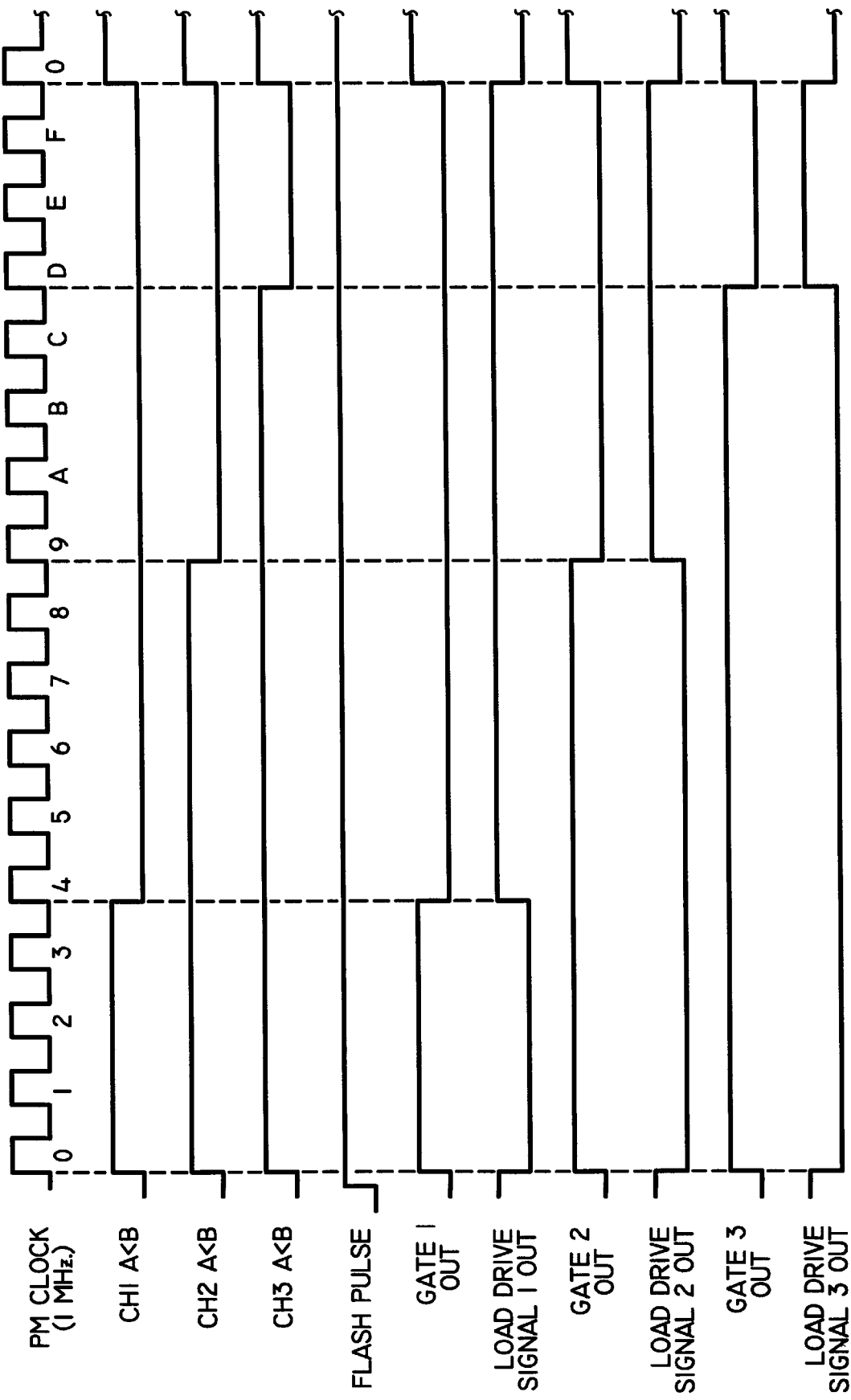
FIG. 6 is a timing diagram illustrating a trigger signal and output pulses having different duty cycles initiated by the trigger signal.

Simultaneously, the timing section 42 continuously generates count data which is input into each comparator 48 for each PM channel. Each comparator 48 compares the count data to the preset duty cycle count value and a comparison output is applied to the corresponding channel gating circuit of the gating section 46. When the flash pulse is ON the output of each channel gating circuit is applied to corresponding load drivers 30 in load drive section 22 to either activate or deactivate the corresponding load 16. FIG. 6 is a timing diagram illustrating different load drive signals with different duty cycles, where the duty cycle controller for channel 1 is set to 4 hex, for channel 2 is set to 9 hex and for channel 3 is set to 0D Hex.

The pulse generator clock signal shifts out the count value in the pulse generator (shift register) and when the last bit of the count is shifted out the flash pulse turns OFF so that each channel gating circuit is turned OFF and the loads 16 are deactivated.

It will be understood that various modifications can be made to the embodiments of the present invention herein without departing from the spirit and scope thereof. For example, various types of external trigger sources and loads may be used in the system of the present invention, and various system configurations may be employed. Therefore, the above description should not be construed as limiting the invention, but merely as preferred embodiments thereof. Those skilled in the art will envision other modifications within the scope and spirit of the invention as defined by the claims appended hereto.

What is claimed is:

1. A pulse generator system comprising:

a trigger interface having an input connected to an external trigger source, and configured to generate a pulse trigger signal in response to a trigger signal from the external trigger source;

a clock generator responsive to said pulse trigger signal and configured to generate a plurality of clock signals including a flash pulse clock signal and a duty cycle clock signal;

a flash pulse generator responsive to said flash pulse clock signal and to at least one user definable input signal such that said flash pulse generator generates a flash pulse signal to enable activation of a plurality of external loads;

a timing section responsive to said duty cycle clock signal and configured to output duty cycle count data;

a comparison section configured to compare said timing section output duty cycle count data with duty cycle count data defined by a user and to generate at least one output comparison output signal;

a gating section configured to receive said flash pulse signal and said at least one comparison output signal, and to output a plurality of load drive signals; and a load drive section having a plurality of load drivers wherein each load driver corresponds to one of the plurality of external loads, for selectively driving the plurality of loads.

2. The system according to claim 1, wherein said flash pulse generator comprises a shift register and said user definable input signal is generated by an n-bit switch.

3. The system according to claim 1, wherein said trigger interface isolates said pulse trigger signal from variations in the trigger signal.

4. The system according to claim 3, wherein said trigger interface optically isolates said pulse trigger signal from variations in the trigger signal.

5. The system according to claim 4, wherein said trigger interface comprises a phototransistor.

6. The system according to claim 1, wherein said timing section comprises an n-bit counter.

7. The system according to claim 6, wherein said n-bit counter comprises a 4-bit counter.

8. The system according to claim 1, wherein said comparison section comprises a plurality of n-bit comparators.

9. The system according to claim 8, wherein each of said n-bit comparators comprise 4-bit comparators.

10. The system according to claim 1, wherein said gating section comprises a plurality of gating circuits wherein one of said plurality of gating circuits corresponds to one of the external loads.

11. An illuminator system comprising:
   a remote trigger source;
   a plurality of loads;
   a trigger interface having an input connected to said trigger source, said trigger interface being configured to generate a pulse trigger signal in response to a trigger signal from said trigger source;
   a clock generator responsive to said pulse trigger signal and configured to generate a plurality of clock signals including a flash pulse clock signal and a duty cycle clock signal;
   a flash pulse generator responsive to said flash pulse clock signal and to at least one user definable input signal such that said flash pulse generator generates a flash pulse signal to enable activation of said plurality of loads;
   a timing section responsive to said duty cycle clock signal and configured to output duty cycle count data;
   a comparison section configured to compare said timing section output duty cycle count data with duty cycle count data defined by a user and to generate at least one output comparison output signal;
   a gating section configured to receive said flash pulse signal and said at least one comparison output signal, and to output a plurality of load drive signals; and a load drive section having a plurality of load drivers wherein each load driver corresponds to one of said plurality of loads, so as to selectively drive said plurality of loads in response to said load drive signals.

12. The system according to claim 11, wherein said flash pulse generator comprises a shift register and said user definable input signal is generated by an n-bit switch.

13. The system according to claim 11, wherein said trigger interface isolates said pulse trigger signal from variations in said trigger signal.

14. The system according to claim 11, wherein said trigger source comprises a computer configured to generate said trigger signal.

15. The system according to claim 11, wherein each of said plurality of loads comprises at least one array of light emitting diodes.

16. The system according to claim 11, wherein said timing section comprises an n-bit counter.

17. The system according to claim 1, wherein said comparison section comprises a plurality of n-bit comparators.

18. The system according to claim 1, wherein said gating section comprises a plurality of gating circuits wherein one of said plurality of gating circuits corresponds to one of said plurality of loads.

19. A pulse modulator circuit for generating multiple drive signals to drive a plurality of light emitting diodes in LED arrays, comprising:
   a trigger interface configured to receive a trigger signal from an external trigger source, and to generate a pulse trigger signal in response to said external trigger source;
   a clock generator response to said pulse trigger signal to generate a pulse duration clock signal and at least a duty cycle clock signal;
   a flash pulse generator responsive to said pulse duration clock signal and an external flash pulse duration signal to generate a flash pulse signal;
   a timing section responsive to said duty cycle clock signal and configured to output duty cycle count data;
   a comparison section configured to compare said timing section output duty cycle count data with duty cycle count data defined by a user and to generate at least one output comparison signal; and
   a gating section responsive to said flash pulse signal and said at least one comparison output signal so as to output a plurality of load drive signals, wherein each load drive signal activates or deactivates an LED array.

* * * * *

UNITED STATES PATENT AND TRADEMARK OFFICE
CERTIFICATE OF CORRECTION

PATENT NO. : 5,815,018
DATED : September 29, 1998
INVENTOR(S) : MICHAEL L. SOBORSKI It is certified that error appears in the above-indentified patent and that said Letters Patent is hereby corrected as shown below: On the title page:

At [56] References Cited, change "4,893,598" to --4,894,598--.

Signed and Sealed this

Second Day of February, 1999

Attest:

*Attesting Officer*

*Acting Commissioner of Patents and Trademarks*